United States Patent
Jiang

(10) Patent No.: US 11,247,247 B2
(45) Date of Patent: Feb. 15, 2022

(54) METHOD AND DEVICE FOR COLLECTING, WASHING AND DRYING SOLID PARTICLES BY PNEUMATIC CONVEYING

(71) Applicant: Guangbin Jiang, Panjin (CN)

(72) Inventor: Guangbin Jiang, Panjin (CN)

(*) Notice: Subject to any disclaimer, the term of this patent is extended or adjusted under 35 U.S.C. 154(b) by 0 days.

(21) Appl. No.: 16/952,113

(22) Filed: Nov. 19, 2020

(65) Prior Publication Data

US 2021/0069755 A1 Mar. 11, 2021

Related U.S. Application Data

(63) Continuation of application No. PCT/CN2019/091491, filed on Jun. 17, 2019.

(30) Foreign Application Priority Data

Jun. 28, 2018 (CN) .......................... 201810747943.9
Apr. 11, 2019 (CN) .......................... 201910317485.X

(51) Int. Cl.
*B08B 3/10* (2006.01)
*G01N 1/34* (2006.01)

(52) U.S. Cl.
CPC .................... *B08B 3/10* (2013.01); *G01N 1/34* (2013.01)

(58) Field of Classification Search
CPC combination set(s) only.
See application file for complete search history.

(56) References Cited

U.S. PATENT DOCUMENTS 6,267,016 B1 * 7/2001 Call ..................... G01N 1/2273
73/863.22

FOREIGN PATENT DOCUMENTS

| CN | 102419268 A | 4/2012 |
| CN | 203350100 U | 12/2013 |
| CN | 204865129 U | 12/2015 |
| CN | 109878805 A | 6/2019 |
| JP | 2006321632 A | 11/2006 |

OTHER PUBLICATIONS

Machine translation of CN102419268 (Year: 2012).*
ISR of PCT/CN2019/091491.

* cited by examiner

*Primary Examiner* — Erin F Bergner

(57) ABSTRACT

The present invention relates to a method and device for collecting, washing and drying solid particle samples used in collecting the solid particle samples in sample collection work in the fields of industrial production and scientific research, and particularly relates to a method and device for collecting, washing and drying solid particles by pneumatic conveying. A method for collecting, washing and drying solid particles by pneumatic conveying comprises: collecting and conveying a sample mixture containing solid particles into a solid particle collecting and processing device by a pneumatic conveying airflow; then disturbing and diluting the collected sample mixture containing solid particles in the solid particle collecting and processing device by the pneumatic conveying airflow and a washing liquid to filter and wash solid particle samples. The present invention overcomes the problems in the prior art: washing and drying to realize automatic one-stop completion of collection.

10 Claims, 5 Drawing Sheets

```
┌─────────────────────────────────────────────────────────────────────┐
│ Collecting and conveying a sample mixture containing solid particles into a │
│  solid particle collecting and processing device by a pneumatic conveying   │
│                                airflow                              │
└─────────────────────────────────────────────────────────────────────┘
```
```
┌─────────────────────────────────────────────────────────────────────┐
│ Disturbing and diluting the collected sample mixture containing solid particles in │
│  the solid particle collecting and processing device by the pneumatic conveying    │
│     airflow and a washing liquid to filter and wash solid particle samples          │
└─────────────────────────────────────────────────────────────────────┘
```
```
┌─────────────────────────────────────────────────────────────────────┐
│  Using the pneumatic conveying airflow to discharge waste from the washing  │
│                             waste liquid                             │
└─────────────────────────────────────────────────────────────────────┘
```
```
┌─────────────────────────────────────────────────────────────────────┐
│    Drying the washed solid particle samples by using the pneumatic conveying │
│                                airflow                              │
└─────────────────────────────────────────────────────────────────────┘
```
```
┌─────────────────────────────────────────────────────────────────────┐
│  Completing collection, washing and drying of the solid particle samples in one │
│                                  step                                │
└─────────────────────────────────────────────────────────────────────┘
```

Fig. 1

METHOD AND DEVICE FOR COLLECTING, WASHING AND DRYING SOLID PARTICLES BY PNEUMATIC CONVEYING

TECHNICAL FIELD

The present invention relates to a method and device for collecting, washing and drying solid particle samples used in collecting the solid particle samples in sample collection work in the fields of industrial production and scientific research, and particularly relates to a method and device for collecting, washing and drying solid particles by pneumatic conveying.

BACKGROUND

At present, in the sample collection work in the fields of industrial production and scientific research, a sampling method is established on the theoretical basis of mathematical statistics and probability theory. Random sampling and counting sampling methods are often used. Analysis objects of different industries are different. Generally, sampling errors are often greater than analysis errors. Therefore, a sampling link is very important. If the sampling is not accurate, even if the analysis is very careful and accurate, it is meaningless.

In the prior art, after collected, a sample generally needs to be processed preliminarily, such as washing and drying. This stage is important for the quality assurance of the sample, and will bring serious consequences to production and scientific research if not handled properly.

Three links of collection, washing and drying of a solid particle sample have always been completed through manual operation. It is tedious and time-consuming, and cannot ensure the quality conformance of the samples. Automatic sample collection has always been a wish of the industry as well as the development direction of the sample collection industry.

SUMMARY

With respect to the defects that the existing solid particle sample collection work is complicated and time-consuming and cannot be completed automatically, the present invention aims to overcome the manual operation for three links of collection, washing and drying of solid particle samples in the prior art to design a complete method for collecting, washing and drying the solid particle samples, thereby achieving one-stop completion of collection, washing and drying of the solid particle samples.

In order to achieve the above purpose, the present invention provides a method which uses the energy of an airflow, especially the principle of pneumatic conveying, evaporation and drying of the airflow, to quickly collect and filter the solid particle samples in a sample mixture containing solid particles, and wash and dry the solid particle samples. Firstly, the sample mixture containing the solid particles is collected and conveyed into a filtering device of a solid particle collecting and processing device by a pneumatic conveying airflow; then the collected sample mixture containing solid particles is disturbed and diluted in the filtering device by the pneumatic conveying airflow and a washing liquid to filter and wash solid particles; the pneumatic conveying airflow is used to discharge waste from the washing waste liquid; and the washed solid particle samples are dried to complete the one-stop collection, washing and drying of the solid particle samples.

A specific technical solution is: a method for collecting, washing and drying solid particles by pneumatic conveying comprises: firstly, collecting and conveying the sample mixture containing the solid particles into a solid particle collecting and processing device by a pneumatic conveying airflow; then disturbing and diluting the collected sample mixture containing solid particles in the solid particle collecting and processing device by the pneumatic conveying airflow and a washing liquid to filter and wash solid particle samples; using the pneumatic conveying airflow to discharge waste from the washing waste liquid; and finally drying the washed solid particle samples by using the pneumatic conveying airflow.

To complete the above technical solution, the present invention specially designs a device for collecting, washing and drying solid particles by pneumatic conveying. The device for collecting, washing and drying solid particles by pneumatic conveying comprises a solid particle collecting and processing device and a negative pressure pneumatic conveying generator; a main body of the solid particle collecting and processing device is a closed tank; the tank of the solid particle collecting and processing device is provided with waste discharge interfaces and a collecting port; a filtering device is arranged in the tank of the solid particle collecting and processing device; the filtering device is provided with a filtering device entrance; the filtering device entrance is communicated with the collecting port; and the waste discharge interfaces arranged on the tank of the solid particle collecting and processing device are communicated with the negative pressure pneumatic conveying generator through a pipeline.

The solid particle collecting and processing device is provided with a collecting tube; the collecting tube is communicated with the filtering device entrance; after the collecting tube penetrates through the collecting port of the solid particle collecting and processing device, the other end of the collecting tube is an extended collecting port; the tube wall of the collecting tube and an opening of the original collecting port of the solid particle collecting and processing device are sealed and fixed.

The collecting tube is a hollow pipeline structure.

A waste liquid diversion device is arranged at the waste discharge interfaces of the solid particle collecting and processing device.

The waste liquid diversion device has a guiding inclined surface structure, is a device used to guide the flow direction of liquid, and can drain the waste liquid to flow towards the waste discharge interfaces.

The solid particle collecting and processing device is provided with more than one vibration device, and the vibration device is beneficial to improve the filtering and washing effects of the solid particles.

The upper end and the lower end of the solid particle collecting and processing device are provided with two waste discharge interfaces communicated to the negative pressure pneumatic conveying generator; and the two waste discharge interfaces are respectively opened and closed under the control of gate valves.

The solid particle collecting and processing device and the negative pressure pneumatic conveying generator are also connected with a waste liquid tank: the waste liquid tank is a closed structure; the waste liquid tank is arranged between the solid particle collecting and processing device and the negative pressure pneumatic conveying generator through a pipeline. The waste liquid tank is provided with a waste liquid tank airflow outlet; the waste liquid tank airflow outlet is communicated with the negative pressure pneumatic conveying generator; the waste liquid tank is also provided with a waste liquid tank inlet; the waste liquid tank inlet is communicated with the waste discharge interfaces of the solid particle collecting and processing device through a pipeline; and the lowest point of the bottom of the waste liquid tank is provided with a waste liquid discharge outlet.

The bottom of the waste liquid tank has a guiding inclined surface structure to drain the settled waste liquid to flow towards the waste liquid discharge outlet.

More than one washing liquid injection interface is arranged on the solid particle collecting and processing device.

The washing liquid injection interface is connected with a washing liquid supply device through a pipeline.

The device for collecting, washing and drying solid particles by pneumatic conveying may also be provided with a hot air generator; and hot air generated by the hot air generator is blown to the solid particle collecting and processing device.

The collecting port introduces the hot air into the solid particle collecting and processing device for drying the solid particles.

The present invention uses the device for collecting, washing and drying solid particles by pneumatic conveying to overcome the problems in the prior art: the collection work of the solid particle samples in the sample mixture containing the solid particles is in a manner of manual collection, washing and drying to realize automatic one-stop completion of collection, sampling, washing and drying of the solid particles; and the device can be implemented online in solid particle sample collection operation.

The solid particle collecting and processing device can be installed on a mechanical device that can carry the device to complete the actions of movement, rotation and inclination, and completes each link action through automatic control to collect, wash and dry the solid particle samples. When required by a working environment or other situations, the collection, washing and drying operation of the solid particle samples can also be controlled by manual operation.

DESCRIPTION OF DRAWINGS

FIG. 1 shows a block diagram of a method for collecting, washing and drying solid particles by pneumatic conveying;

In the figures:

Figure 2:
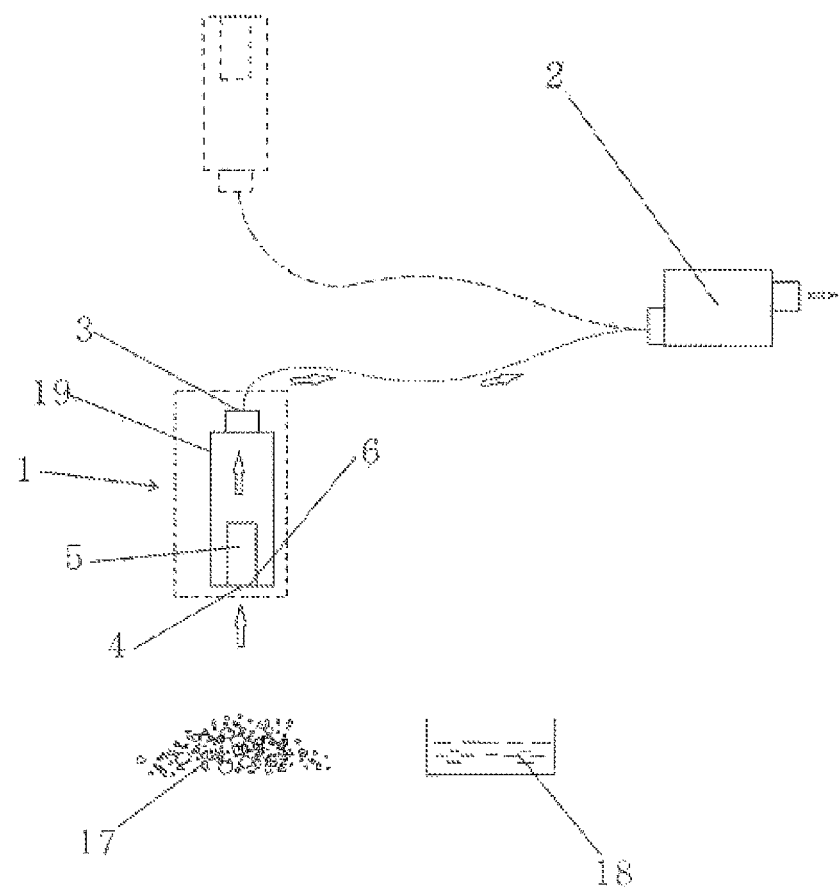
FIG. 2 shows a schematic diagram of a device for collecting, washing and drying solid particles by pneumatic conveying.

solid particle collecting and processing device 1; negative pressure pneumatic conveying generator 2; waste discharge interface 3; collecting port 4; filtering device 5; filtering device entrance 6; collecting tube 7; waste liquid diversion device 8; vibration device 9; waste liquid tank 10; waste liquid tank airflow outlet 11; waste liquid tank inlet 12; waste liquid discharge outlet 13; washing liquid injection interface 14; washing liquid supply device 15; hot air generator 16; hot air 16-1; sample mixture 17 containing solid particles; washing liquid 18; and tank 19.

DETAILED DESCRIPTION

The present invention will be further described below in combination with the drawings and the embodiments.

As shown in FIG. 1:

A block diagram of a method for collecting, washing and drying solid particles by pneumatic conveying is shown. The method for collecting, washing and drying solid particles by pneumatic conveying comprises: firstly, collecting and conveying a sample mixture containing the solid particles into a solid particle collecting and processing device by a pneumatic conveying airflow; then disturbing and diluting the collected sample mixture containing solid particles in the solid particle collecting and processing device by the pneumatic conveying airflow and a washing liquid to filter and wash solid particle samples; using the pneumatic conveying airflow to discharge waste from the washing waste liquid; and finally drying the washed solid particle samples by using the pneumatic conveying airflow.

To well complete the above method for collecting, washing and drying solid particles by pneumatic conveying, the present invention designs a device for collecting, washing and drying solid particles by pneumatic conveying. The device for collecting, washing and drying solid particles by pneumatic conveying is used according to actual work needs. Different implementation solutions are designed for the device for collecting, washing and drying solid particles by pneumatic conveying. The device for collecting, washing and drying solid particles by pneumatic conveying is further described below in combination with the drawings and embodiments.

Embodiment 1

As shown in FIG. 2:

A device for collecting, washing and drying solid particles by pneumatic conveying is provided. The device for collecting, washing and drying solid particles by pneumatic conveying comprises a solid particle collecting and processing device 1 and a negative pressure pneumatic conveying generator 2; a main body of the solid particle collecting and processing device 1 is a closed tank. 19; the tank 19 of the solid particle collecting and processing device 1 is provided with waste discharge interfaces 3 and a collecting port 4; a filtering device 5 is arranged in the tank 19 of the solid particle collecting and processing device 1; the filtering device 5 is provided with a filtering device entrance 6; the filtering device entrance 6 is communicated with the collecting port 4; and the waste discharge interfaces 3 arranged on the tank 19 of the solid particle collecting and processing device 1 are communicated with the negative pressure pneumatic conveying generator 2 through a pipeline.

The negative pressure pneumatic conveying generator 2 may be a centrifugal, rotary, reciprocating device capable of generating a negative pressure pneumatic conveying airflow, such as: Roots blower, vacuum piston pump, Roots vacuum pump, vacuum feeder, dust collecting motor, vortex blower and water ring vacuum pump.

The filtering device 5 is a filter screen capable of filtering solid particles, such as: filter screen barrel, filter screen bag, screen cylinder with a closed end, filter element, net bag and filter sieve.

In work: the negative pressure pneumatic conveying generator 2 is started; the pneumatic conveying airflow generated near the collecting port 4 flows into the solid particle collecting and processing device 1 through the filtering device 5 and then flows out through the waste discharge interfaces 3.

Further, the collecting port 4 of the solid particle collecting and processing device 1 is close to and comes into contact with a sample mixture 17 containing solid particles; and the sample mixture 17 containing solid particles is sucked into the filtering device 5 by the pneumatic conveying airflow generated near the collecting port 4 and intercepted by the filtering device 5.

Further, the collecting port 4 of the solid particle collecting and processing device 1 is downward, and the downward state of the collecting port 4 is kept. A washing liquid 18 is sucked through the collecting port 4; and the washing liquid 18 passes through the filtering device 5 and enters the solid particle collecting and processing device 1. Because the inner diameter of the tank 19 of the solid particle collecting and processing device 1 is much larger than the inner diameter of the collecting port 4, the pneumatic conveying airflow is weakened exponentially when entering the solid particle collecting and processing device 1, and the washing liquid 18 entering the solid particle collecting and processing device 1 stagnates and settles near the collecting port 4 in the solid particle collecting and processing device 1, and shuttles back and forth inside and outside the meshes of the filtering device 5 to dilute and disturb the sample mixture containing solid particles intercepted in the filtering device 5 together with the pneumatic conveying airflow, so as to filter out and wash solid particle samples.

Further, the solid particle collecting and processing device 1 is rotated to make the collecting port 4 upward. The washing waste liquid in the solid particle collection and processing device 1 is settled near the waste discharge interface 3, and is carried by the pneumatic conveying airflow out of the waste discharge interface 3.

To increase the drying efficiency, the solid particle collecting and processing device 1 can be rotated to make the collecting port 4 downward; the pneumatic conveying airflow continuously disturbs the solid particles retained in the filtering device 5; the washing liquid on the surfaces of the solid particle samples in the filtering device 5 is evaporated to dry the washed solid particle samples.

Embodiment 2

Figure 3:
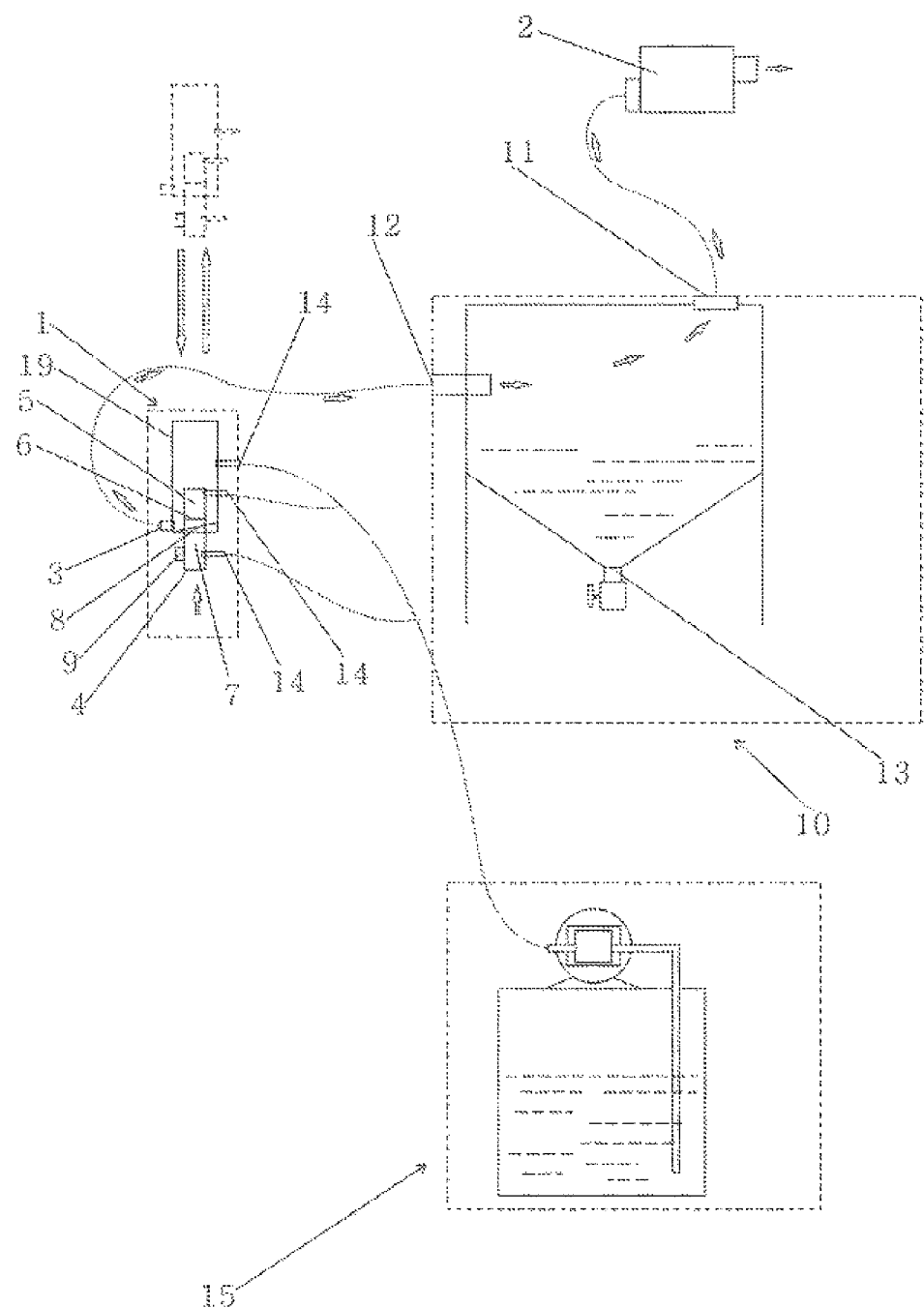
FIG. 3 shows a schematic diagram of a device for collecting, washing and drying solid particles by pneumatic conveying provided with a waste liquid tank and a washing liquid supply device.

As shown in FIG. 3:

A device for collecting, washing and drying solid particles by pneumatic conveying is provided. The solid particle collecting and processing device 1 and the negative pressure pneumatic conveying generator 2 are also connected with a waste liquid tank 10: the waste liquid tank 10 is a closed structure; the waste liquid tank 10 is arranged between the solid particle collecting and processing device 1 and the negative pressure pneumatic conveying generator 2 through a pipeline; the waste liquid tank 10 is provided with a waste liquid tank airflow outlet 11; the waste liquid tank airflow outlet 11 is communicated with the negative pressure pneumatic conveying generator 2; the waste liquid tank 10 is also provided with a waste liquid tank inlet 12; the waste liquid tank inlet 12 is communicated with the waste discharge interfaces 3 of the solid particle collecting and processing device 1 through a pipeline; and the lowest point of the bottom of the waste liquid tank 10 is provided with a waste liquid discharge outlet 13.

The bottom of the waste liquid tank 10 has a guiding inclined surface structure to drain the settled waste liquid to flow towards the waste liquid discharge outlet 13.

More than one washing liquid injection interface 14 is arranged on the solid particle collecting and processing device 1.

The washing liquid injection interface 14 is connected with a washing liquid supply device 15 through a pipeline.

A waste liquid diversion device 8 is arranged at the waste discharge interfaces 3 of the solid particle collecting and processing device 1.

The waste liquid diversion device 8 has a guiding inclined surface structure, is a device used to guide the flow direction of liquid, and can drain the waste liquid to flow towards the waste discharge interfaces 3.

When the collecting tube 7 and the waste liquid diversion device 8 are designed at the same end of the tank 19 of the solid particle collecting and processing device 1, the collecting tube 7 needs to penetrate through the waste liquid diversion device 8. The penetration part of the collecting tube 7 and the waste liquid diversion device 8 are sealed and fixed.

The solid particle collecting and processing device 1 is provided with more than one vibration device 9. The vibration device 9 is a device that can generate deterministic vibration and random vibration, such as vibrator, vibrating pump, vibrating rod and ultrasonic vibrator.

In work: the negative pressure pneumatic conveying generator 2 is started; after the collecting port 4 is extended through the collecting tube 7, the pneumatic conveying airflow generated near the collecting port 4 flows into the solid particle collecting and processing device 1 through the collecting tube 7 and the filtering device 5 and then flows out from the waste liquid tank airflow outlet 11 successively through the waste discharge interfaces 3, the waste liquid tank inlet 12 and the waste liquid tank 10.

The collecting tube 7 is a hollow pipeline structure, such as straight tube, curved tube, reducer, or a combination of straight tube and reducer.

Further, the collecting port 4 of the solid particle collecting and processing device 1 is close to and comes into contact with a sample mixture 17 containing solid particles; and the sample mixture 17 containing solid particles is sucked into the filtering device 5 by the pneumatic conveying airflow generated near the collecting port 4 and intercepted by the filtering device 5. Meanwhile, the washing liquid supply device 15 injects the washing liquid into the solid particle collecting and processing device 1 through the washing liquid injection interface 14 communicated by the pipeline.

The washing liquid supply device 15 is a device which conveys the washing liquid for the washing liquid injection interface 14, such as a diaphragm pump, liquid booster pump, piston pump, water pump and tower washing liquid storage tank.

Further, because the inner diameter of the tank 19 of the solid particle collecting and processing device 1 is much larger than the inner diameter of the collecting port 4, the pneumatic conveying airflow is weakened exponentially in the solid particle collecting and processing device 1, and the washing liquid dilutes, disturbs and flushes the sample mixture 17 containing solid particles intercepted in the filtering device 5 under the carrying of the pneumatic conveying airflow, so as to filter out and wash solid particle samples. The washing waste liquid passes through the filtering device 5, is carried by the pneumatic conveying airflow to flow through the waste liquid diversion device 8 and the pipeline to enter the waste liquid tank 10 and settles at the bottom of the waste liquid tank 10.

The waste liquid diversion device 8 has a guiding inclined surface structure such as U type, V type, inclined surface, arc surface, conical tube, reducer, spherical head structure and elliptical head.

The waste liquid diversion device 8 in the present embodiment is an inclined surface, which is arranged in the tank 19 of the solid particle collecting and processing device 1 and is penetrated by the collecting tube 7.

The waste liquid discharge outlet 13 at the lowest point of the bottom of the waste liquid tank 10 can manually empty the accumulated waste liquid or automatically empty the accumulated waste liquid.

The bottom of the waste liquid tank 10 has a guiding inclined surface structure such as U type, V type, inclined surface, arc surface, conical tube, reducer, spherical head structure and elliptical head.

Further, the washing liquid supply device 15 stops water supply. The washing waste liquid stored in the filtering device 5 among the washed solid particle samples is carried and precipitated by the pneumatic conveying airflow, discharged and settled in the waste liquid tank 10.

Further, the pneumatic conveying airflow continuously evaporates the washing waste liquid on the surfaces of the solid particles in the filtering device 5 to dry the washed solid particle samples.

The vibration device 9 is operated in the whole process or in stages during the collection, washing and drying of the solid particle samples, so as to improve the filtering and washing effects of the solid particle samples.

After the sample mixture containing solid particles is sucked into the solid particle collecting and processing device 1 by the pneumatic conveying airflow generated near the collecting port 4, the solid particle collecting and processing device 1 can be lifted to a certain height, so as to thoroughly discharge the waste liquid remaining in the pipeline. The collection, washing and drying of the solid particle samples are completed.

Embodiment 3

Figure 4:
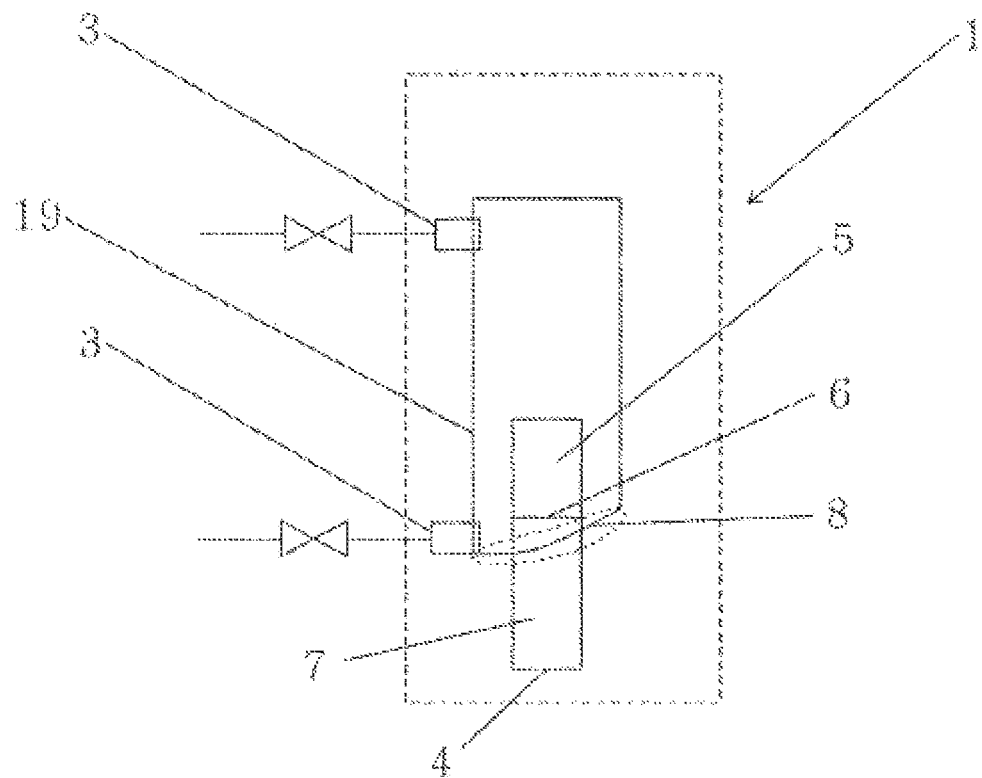
FIG. 4 shows a schematic diagram of a solid particle collecting and processing device with two waste discharge interfaces in a device for collecting, washing and drying solid particles by pneumatic conveying.

As shown in FIG. 4:

A device for collecting, washing and drying solid particles by pneumatic conveying is provided. The upper end and the lower end of the solid particle collecting and processing device 1 are provided with two waste discharge interfaces 3; and the two waste discharge interfaces 3 are respectively opened and closed under the control of gate valves.

When the solid particle samples are collected and washed, the upper waste discharge interface 3 is opened by the gate valve, and the lower waste discharge interface 3 is closed by the gate valve. The washing liquid stagnates and settles near the collecting port 4 in the tank 19 of the solid particle collecting and processing device 1, and shuttles back and forth inside and outside the meshes of the filtering device 5 to dilute and disturb the sample mixture containing solid particles intercepted in the filtering device 5 together with the pneumatic conveying airflow, so as to filter out and wash the solid particle samples.

When the solid particle samples are subjected to waste discharge and dried, the upper waste discharge interface 3 is closed by the gate valve, and the lower waste discharge interface 3 is opened by the gate valve. The washing waste liquid is carried by the pneumatic conveying airflow, diverted through the waste liquid diversion device 8 and discharged through the lower waste discharge interface 3. Meanwhile, the washing waste liquid stored in the filtering device 5 among the filtered and washed solid particle samples is precipitated by the pneumatic conveying airflow, and discharged through the lower waste discharge interface 3.

Further, the pneumatic conveying airflow continuously evaporates the washing waste liquid on the surfaces of the solid particle samples in the filtering device 5 to dry the washed solid particle samples.

The waste liquid diversion device 8 has an inclined surface structure, which is arranged on the tank 19 of the solid particle collecting and processing device 1 and is penetrated by the collecting tube.

Embodiment 4

Figure 5:
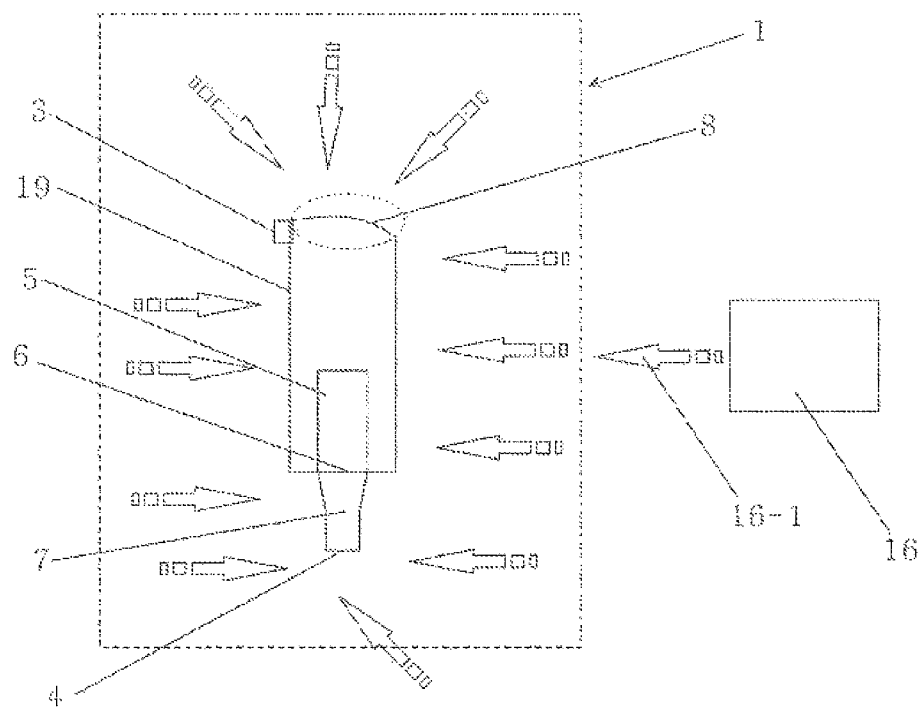
FIG. 5 shows a schematic diagram in which hot air generated by a hot air generator arranged in a device for collecting, washing and drying solid particles by pneumatic conveying is blown towards a solid particle collecting and processing device.

As shown in FIG. 5:

A device for collecting, washing and drying solid particles by pneumatic conveying is provided. The device for collecting, washing and drying solid particles by pneumatic conveying also comprises a hot air generator 16; and hot air generated by the hot air generator 16 is blown to the solid particle collecting and processing device 1. The hot air 16-1 generated by the hot air generator 16 is blown to the solid particle collecting and processing device 1. The collecting port 4 introduces the hot air 16-1 into the solid particle collecting and processing device 1 through the pneumatic conveying airflow for increasing the speed of drying the solid particle samples.

The waste liquid diversion device 8 has an arc structure, which is arranged on the tank 19 of the solid particle collecting and processing device 1; and the diversion of the waste liquid diversion device 8 is realized by rotating the solid particle collecting and processing device 1.

Embodiment 5

Figure 6:
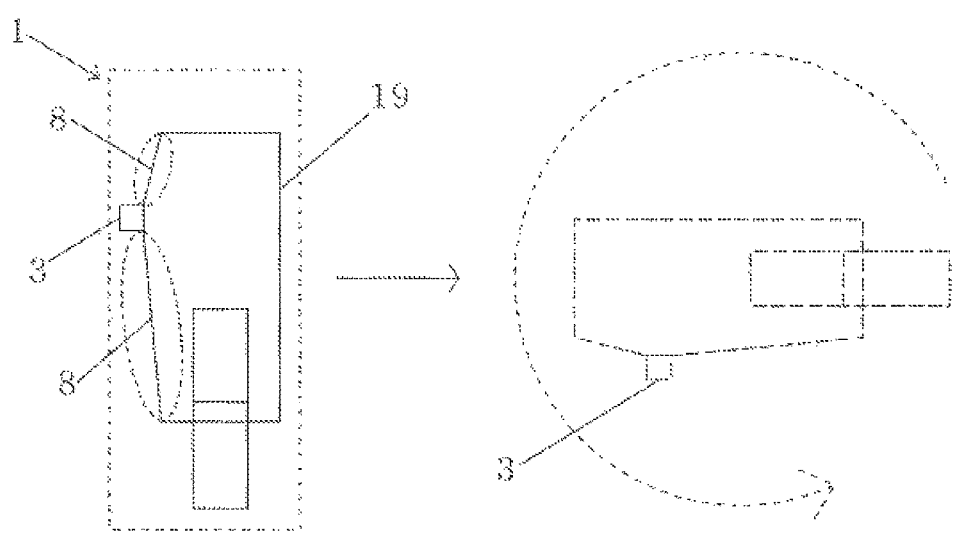
FIG. 6 shows a schematic diagram in which washing waste liquid is discharged by rotating a solid particle collecting and processing device when a waste liquid diversion device of the solid particle collecting and processing device is arranged on a tank of the solid particle collecting and processing device and on a side surface of the tank.

As shown in FIG. 6:

A device for collecting, washing and drying solid particles by pneumatic conveying is provided. The waste liquid diversion device 8 of the solid particle collecting and processing device 1 is a conical tube which is arranged on the tank 19 of the solid particle collecting and processing device 1 and on the side surface of the tank 19. At the stage of waste discharge, the solid particle collecting and processing device 1 is rotated and inclined by a certain angle so that the waste liquid diversion device 8 diverts the washing waste liquid in the solid particle collecting and processing device 1 to the waste discharge interfaces 3 for discharge.

The invention claimed is:

1. A method for collecting, washing and drying solid particles by pneumatic conveying, comprising: firstly, collecting and conveying a sample mixture containing solid particles into a solid particle collecting and processing device by a pneumatic conveying airflow; then disturbing and diluting the collected sample mixture containing solid particles in the solid particle collecting and processing device with the pneumatic conveying airflow and by dispensing a washing liquid to filter and wash the sample mixture; using the pneumatic conveying airflow to discharge waste from the washing liquid; and finally drying the washed solid particle samples by using the pneumatic conveying airflow.

2. A device for collecting, washing and drying solid particles by pneumatic conveying, comprising a solid particle collecting and processing device and a negative pressure pneumatic conveying generator, wherein a main body of the solid particle collecting and processing device is a closed tank; the tank of the solid particle collecting and processing device is provided with waste discharge interfaces and a collecting port; a filtering device is arranged in the tank of the solid particle collecting and processing device; the filtering device is provided with a filtering device entrance; the filtering device entrance is communicated with the collecting port; and the waste discharge interfaces arranged on the tank of the solid particle collecting and processing device are communicated with the negative pressure pneumatic conveying generator through a pipeline, wherein at least one washing liquid injection interface is arranged on the solid particle collecting and processing device; the washing liquid injection interface is connected with a washing liquid supply device through a pipeline.

3. The device for collecting, washing and drying solid particles by pneumatic conveying according to claim 2, wherein the solid particle collecting and processing device is provided with a collecting tube; the collecting tube is communicated with the filtering device entrance; after the collecting tube penetrates through the collecting port of the solid particle collecting and processing device, the other end of the collecting tube is an extended collecting port; the tube wall of the collecting tube and an opening of the original collecting port of the solid particle collecting and processing device are sealed and fixed.

4. The device for collecting, washing and drying solid particles by pneumatic conveying according to claim 3, wherein the collecting tube is a hollow pipeline structure.

5. The device for collecting, washing and drying solid particles by pneumatic conveying according to claim 2, wherein a waste liquid diversion device is arranged at the waste discharge interfaces of the solid particle collecting and processing device; the waste liquid diversion device has a guiding inclined surface structure, is a device used to guide the flow direction of liquid, and can drain the waste liquid to flow towards the waste discharge interfaces.

6. The device for collecting, washing and drying solid particles by pneumatic conveying according to claim 2, wherein the solid particle collecting and processing device is provided with more than one vibration device.

7. The device for collecting, washing and drying solid particles by pneumatic conveying according to claim 2, wherein the upper end and the lower end of the solid particle collecting and processing device are provided with two waste discharge interfaces communicated to the negative pressure pneumatic conveying generator; and the two waste discharge interfaces are respectively opened and closed under the control of gate valves.

8. The device for collecting, washing and drying solid particles by pneumatic conveying according to claim 2, wherein the solid particle collecting and processing device and the negative pressure pneumatic conveying generator are also connected with a waste liquid tank: the waste liquid tank is a closed structure; the waste liquid tank is arranged between the solid particle collecting and processing device and the negative pressure pneumatic conveying generator through a pipeline; the waste liquid tank is provided with a waste liquid tank airflow outlet; the waste liquid tank airflow outlet is communicated with the negative pressure pneumatic conveying generator; the waste liquid tank is also provided with a waste liquid tank inlet; the waste liquid tank inlet is communicated with the waste discharge interfaces of the solid particle collecting and processing device through a pipeline; and the lowest point of the bottom of the waste liquid tank is provided with a waste liquid discharge outlet.

9. The device for collecting, washing and drying solid particles by pneumatic conveying according to claim 8, wherein the bottom of the waste liquid tank has a guiding inclined surface structure to drain the settled waste liquid to flow towards the waste liquid discharge outlet.

10. The device for collecting, washing and drying solid particles by pneumatic conveying according to claim 2, wherein the device for collecting, washing and drying solid particles by pneumatic conveying is provided with a hot air generator; hot air generated by the hot air generator is blown to the solid particle collecting and processing device; the collecting port introduces the hot air into the solid particle collecting and processing device for drying the solid particles.

* * * * *